(12) United States Patent
Moroney et al.

(10) Patent No.: US 7,925,121 B2
(45) Date of Patent: Apr. 12, 2011

(54) THEME-BASED BATCH PROCESSING OF A COLLECTION OF IMAGES

(75) Inventors: Nathan M. Moroney, Palo Alto, CA (US); Ehud Chatow, Palo Alto, CA (US); Andrew E. Fitzhugh, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1016 days.

(21) Appl. No.: 11/742,493

(22) Filed: Apr. 30, 2007

(65) Prior Publication Data

US 2008/0267536 A1    Oct. 30, 2008

(51) Int. Cl.
*G06K 9/03* (2006.01)
(52) U.S. Cl. ........................................................ 382/311
(58) Field of Classification Search .................. D05/9, D05/15, 21, 29, 31; 382/309, 311; 725/45; 718/101; 707/643; 715/235, 732; 717/110; 358/452, 537; 700/87; 386/4
See application file for complete search history.

(56) References Cited

U.S. PATENT DOCUMENTS

| | | | |
|---|---|---|---|
| 2001/0024235 A1* | 9/2001 | Kinjo | 348/232 |
| 2001/0041020 A1* | 11/2001 | Shaffer et al. | 382/305 |
| 2002/0039101 A1* | 4/2002 | Fernandez et al. | 345/581 |
| 2002/0149618 A1* | 10/2002 | Estrada et al. | 345/760 |
| 2008/0092057 A1* | 4/2008 | Monson et al. | 715/744 |

OTHER PUBLICATIONS

"Kodak Picture Maker Demo", http://www.kodak.com/eknec/PageQuerier.jhtml?pq-path=1308&pq-locale=en_US&_requestid=2733, Apr. 30, 2007.

* cited by examiner

*Primary Examiner* — Gregory F Cunningham

(57) ABSTRACT

Processing a collection of images includes identifying a theme for the collection of images, and performing batch processing on the collection of images. The batch processing includes applying a pre-defined group of image editing operations to the images to give the edited images a look and feel that is consistent with the identified theme.

17 Claims, 4 Drawing Sheets

```
┌──────────────────────────────────────────┐
│  IDENTIFY A THEME FOR A COLLECTION OF    │ 110
│                 IMAGES                   │
└──────────────────────────────────────────┘
                     │
                     ▼
┌──────────────────────────────────────────┐
│   APPLY A PRE-DEFINED GROUP OF IMAGE     │
│   EDITING OPERATIONS TO THE IMAGES TO    │ 120
│  GIVE THE EDITED IMAGES A LOOK AND FEEL  │
│   THAT IS CONSISTENT WITH THE IDENTIFIED │
│                 THEME                    │
└──────────────────────────────────────────┘
```

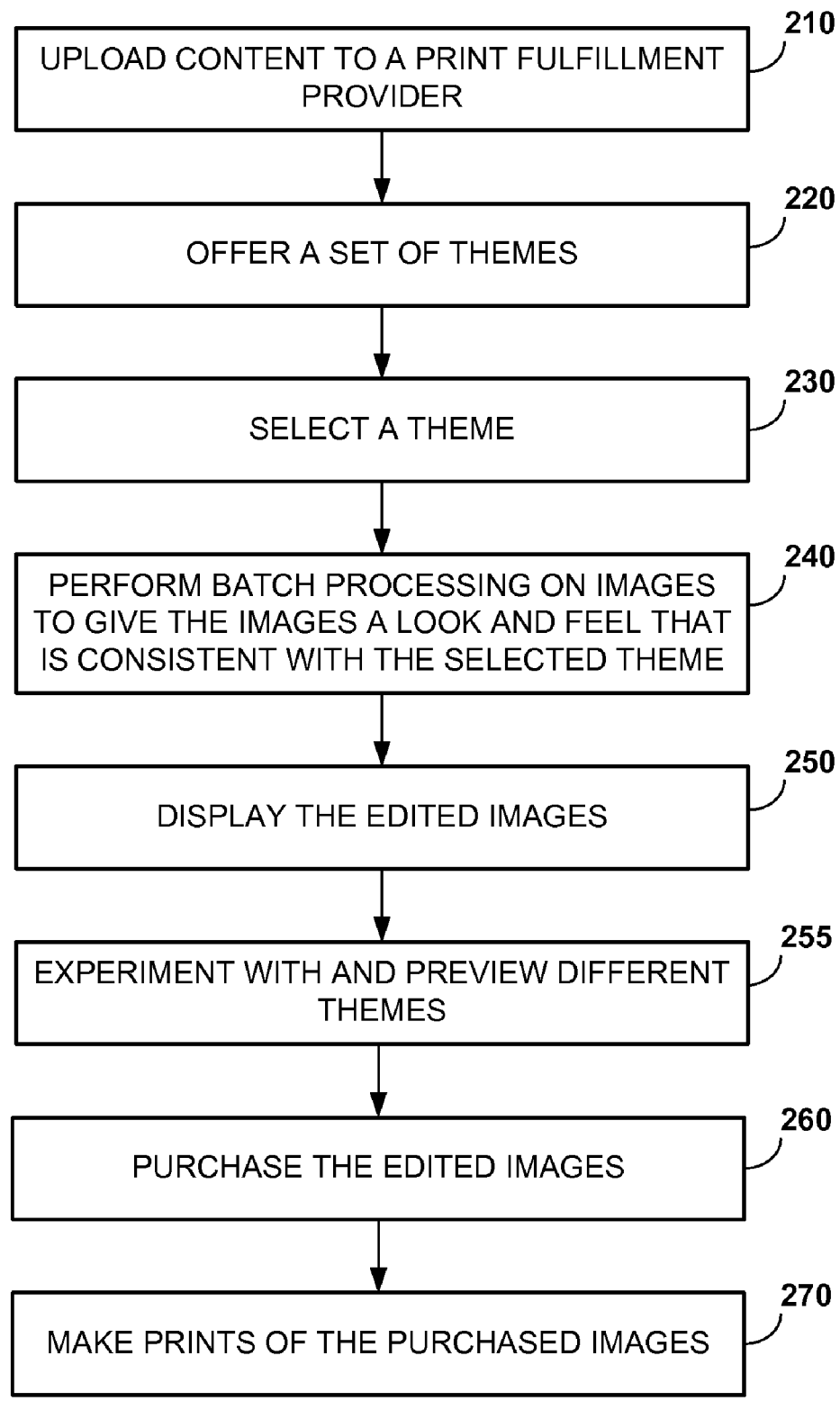

THEME-BASED BATCH PROCESSING OF A COLLECTION OF IMAGES

BACKGROUND

Image editing programs allow all sorts of changes to be made to digital images. Conventional programs offer image editing operations such as color correction, sharpening, contrast adjustments, and filtering, to name but a few.

However, editing an image can take time, as it is often desirable to perform multiple, sequential image editing operations. And if a collection of images is being edited, the total time spent on image editing increases with the complexity and number of image editing operations on each image in the collection, as well as the number of images in the collection.

In some environments, it is not possible or convenient to perform complex image editing on a collection of images. Consider a picture kiosk. A customer uploads a collection of images to the kiosk, selects those images to be printed, indicates the number of prints for each selected image, optionally chooses a print package (e.g., 4"×6", 5"×7", 8"×10"), and commands the kiosk to make prints. Some picture kiosks do not provide a means for editing images before the images are printed and purchased. Other picture kiosks provide rudimentary image editing operations (e.g., red eye correction, zoom and crop, color correction, and brightness and contrast adjustment) on a selected image. Some picture kiosks allow holiday cards or a calendar to be made from a selected image. Here too, the time spent on editing increases with the number and complexity of the image editing operations and the number of images that are edited. Moreover, standing at a picture kiosk for a length of time can be inconvenient both to the customer and to others waiting to use the kiosk.

BRIEF DESCRIPTION OF THE DRAWINGS

FIG. 2 is an illustration of a print fulfillment method in accordance with an embodiment of the present invention.

DETAILED DESCRIPTION

Figure 1:
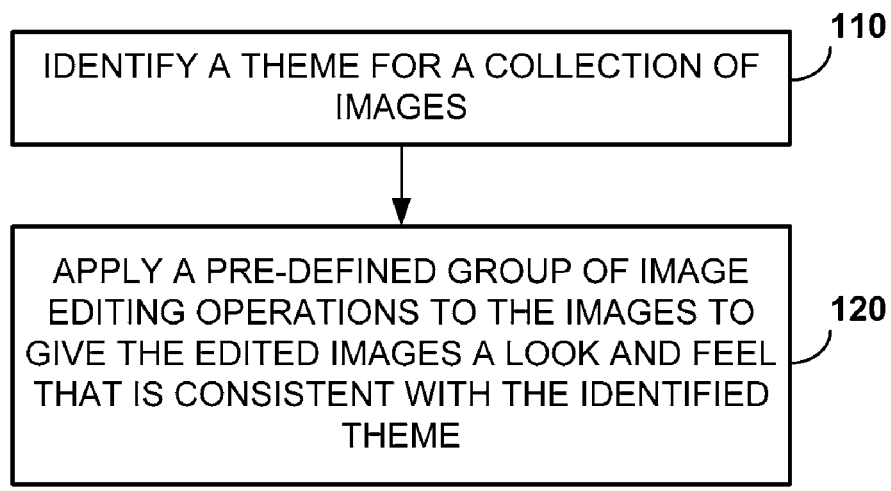
FIG. 1 is an illustration of an image editing method in accordance with an embodiment of the present invention.

Reference is made to FIG. 1, which illustrates a method of processing a collection of digital images. The digital images are not limited to any particular type.

The processing includes identifying a theme for the collection of images (block 110), and performing batch processing on the collection of images. The batch processing includes applying a pre-defined group of image editing operations to the images to give the edited images a look and feel that is consistent with the identified theme (block 120).

As used herein, a theme refers to a distinct characteristic produced by a set of image editing operations. In a portrait theme, facial blemishes could be reduced, eyes whitened and background de-emphasized. In an outdoor theme, sky and foliage could be given hue-specific vividness boosts and sunsets and snow scenes could be processed according to specific local contrast properties. Other themes could include, without limitation, a holiday theme, a sports theme, an anniversary theme, a cartoon theme, a daguerreotype theme, an astronomy theme, a retro theme, a film noir theme, etc.

Other processing could be performed as well. For example, text, borders and other objects can be superimposed over the images to add to the look and feel.

A theme can be identified in various ways. In some embodiments, a menu of different themes can be displayed, and one of the menu items can be selected. In some embodiments, a theme can be entered directly (e.g., by entering text).

In some embodiments a theme could be identified automatically. An image processing algorithm could ascertain a theme from context of the images. As a first example, a collection of images is associated with a magazine, and the context is determined from the type of magazine. As a second example, a collection of images contains metadata or tags, and the context is determined from the metadata or tags. As a third example, themes are inferred through file or directory names. As a fourth example, themes are recognized by people who are trained to recognize themes.

As a fifth example, images are analyzed using software. For instance, face detection software is used to determine whether images are primarily portraits of people. To those images that are considered portraits, a portrait theme could be applied.

The distinct characteristic of the selected theme might not be expressed in the same way in each edited image. However, the selected theme is apparent when the entire collection of edited images is viewed. Thus, the edited images have a look and feel that is consistent with the selected theme.

Consider an example of a collection of forty images captured at a party at a restaurant. Using the method of FIG. 1, different attendees could select different themes for this collection of images. One attendee could select a "Saint Patrick's Day" theme, in which a mild greenish color cast is purposely introduced, edges are slightly blurred and other image processing is applied. Another attendee might select a "Goth" theme, in which the images in the collection have their local contrast reduced, the usage of black increased, flesh tones desaturated, and other image processing consistent with the Goth theme applied.

The pre-defined groups of image editing operations are not limited to any particular image editing operations or to any particular order of operations to achieve a look and feel. The same look and feel can often be accomplished by different sets of image editing operations. A pre-defined group could include multiple, sequential image editing operations, such as color correction, sharpening, contrast adjustments, and filtering, to name but a few.

There are advantages to batch processing with pre-defined groups of image editing operations. The pre-defined groups can be determined in advance by people who are experts in image editing. A layperson might not know which instructions, or combinations of instructions to use in order to express a theme. A layperson might not have the time or patience to learn.

By labeling predefined groups of image editing operations according to themes, the image editing operations are usually easier to comprehend. A large number of possible image processing operations are collapsed into to a much smaller and yet still useful number of fixed components.

By using pre-defined groups of image editing operations, image editing is not limited to a few rudimentary image editing operations. Complex image processing can be performed with multiple disparate operations, quickly and simply by making a single selection.

Groups of image editing instructions can be optimized by trial and error. Even a person who has acquired expertise in image editing could benefit.

A method according to the present invention is useful for image editing programs that run on a workstation or personal computer. For example, a GUI of an image editing program or web browser includes a menu that lists different themes and that also allows a collection if images to be selected. When a theme is selected, a pre-defined group of image editing operations is applied to the selected collection of images to give the edited images a look and feel that is consistent with the selected theme.

A method according to the present invention is especially useful for print fulfillment. Print fulfillment refers to a situation where a customer purchases one or more prints from another party that does the printing. Examples of print fulfillment include online photofinishing services and picture kiosks. A method according to the present invention allows a customer to make complex image editing operations, quickly and conveniently, before the images are printed and the prints purchased.

Reference is now made to FIG. 2, which illustrates an example of print fulfillment. A customer uploads content to a print fulfillment provider (block 210). The print fulfillment provider offers a set of themes to the customer (block 220), and the customer selects a theme (block 230). The fulfillment provider performs batch processing on the images to give the images a look and feel that is consistent with the selected theme (block 240), and displays the edited images to the customer (block 250). If satisfied with the edited images, the customer purchases the edited images (block 260). The print fulfillment provider makes prints of the purchased images (block 270) and, if necessary, delivers the prints to the customer.

As an added advantage, a customer could experiment with and preview different themes on a collection of images (block 255). This could be done sequentially (e.g., a customer applies a first theme to the images and previews the collection, then applies a second theme, and so on), or in parallel (a customer selects multiple themes for comparison, and a layout is displayed of one or more images that were edited according to different themes).

A method according to the present invention is also useful for creating documents that contain collections of images. For example, a GUI of a desktop publishing program includes a menu having different themes.

A method according to the present invention can also be used in combination with the publishing system described in assignee's U.S. Ser. No. 11/741,718 filed 27 Apr. 2007, U.S. Publication No. 2008/0270358, which is incorporated herein by reference. The publishing system provides a publisher interface that is dedicated to receive information about creating a publication and that is also dedicated to initiate a search of an information store. The information store contains information about different members who can contribute to various phases of publication creation. The information store is searched to identify at least one member who can contribute to the creation of the publication.

Figure 3:
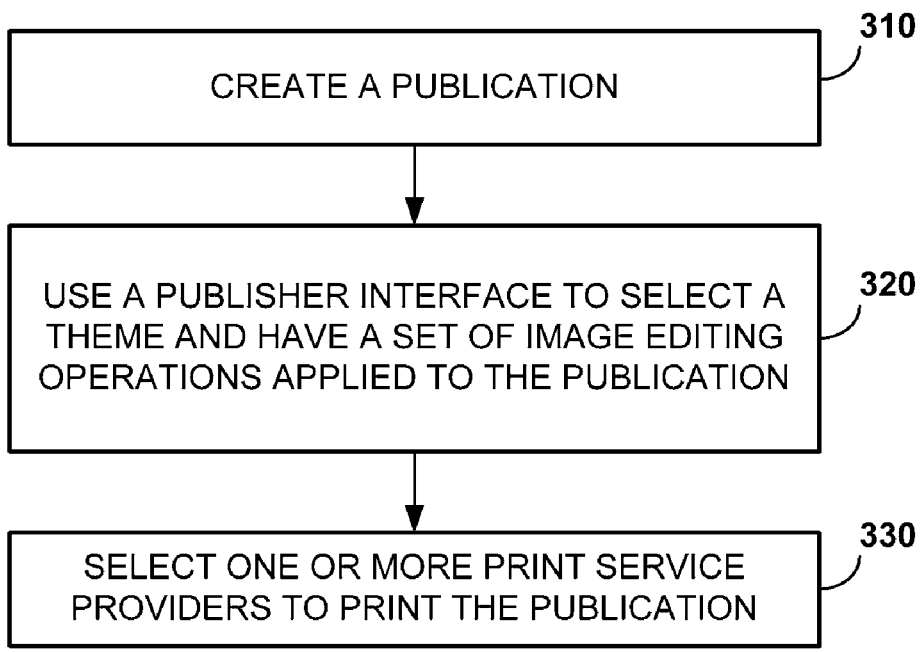
FIG. 3 is an illustration of a publishing method in accordance with an embodiment of the present invention.

Reference is now made to FIG. 3, which illustrates an example of creating a publication with a publisher interface described in U.S. Ser. No. 11/741,718. At block 310, the publication is created. The publication can be created with or without the publisher interface. The publication can be created in electronic form.

At block 320, the publisher interface is used to select a theme and have a set of image editing operations applied to the publication so the publication has a look and feel that is consistent with the selected theme. The publisher interface can be used by a publisher or by any member who has been selected to contribute to creating the publication. The publisher interface may include a menu item for selecting a theme. A pre-defined group of image editing operations corresponding to the selected theme can be applied to content, designs, and advertisements in the publication. For instance, both content and advertisements following a selected theme might catch a reader's eye and make the advertisements easier to find or stand out.

At block 330, the publisher selects one or more print service providers to print the publication. The online photofinishing service might also be selected as a print service provider.

A method according to the present invention can also be useful for a standalone display device (e.g., a printer) having the means to receive a collection of images. A display device can be pre-programmed to display a menu that offers different themes, and apply a set of image editing operations to the images so the images have a look and feel that is consistent with the selected theme. Thus, a method according to the present invention can transform a display device such as a printer into a powerful image editing machine.

Figure 4:
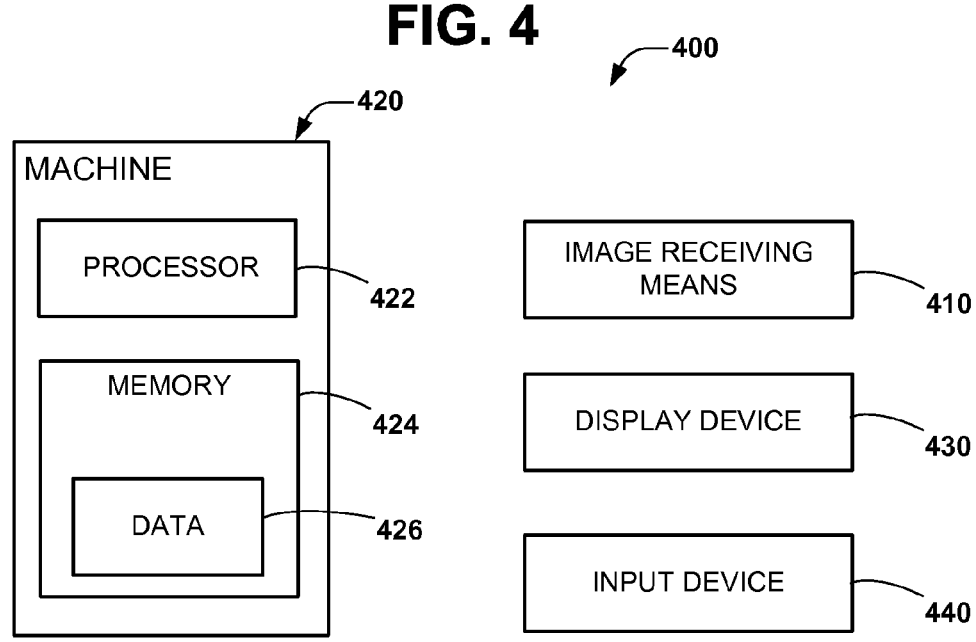
FIG. 4 is an illustration of a system in accordance with an embodiment of the present invention.

Reference is now made to FIG. 4, which illustrates an exemplary system 400 for editing a collection of images. The system 400 includes a means 410 (e.g., memory reader, network card, wireless receiver, USB port) for accessing a collection of images), and a machine 420 including a processor 422 and memory 424. The system 400 further includes a display device 430 (e.g., a video monitor, a print engine), and an input device 440 (e.g., a keypad). The memory 424 is encoded with data 426 for causing the machine 420 to display a plurality of different themes on the display device 430, receive a selected theme from the input device 440, and perform batch processing on a collection of images by applying image editing operations on the images to give the edited images a look and feel that is consistent with the selected theme.

In some embodiments of the present invention, these various components 410-440 could be integrated into a single package. A picture kiosk according to an embodiment of the present invention could contain all of these components 410-440. A printer according to an embodiment of the present invention could contain all of these components 410-440. A computer according to an embodiment of the present invention could contain all of these components 410-440.

Figure 5:
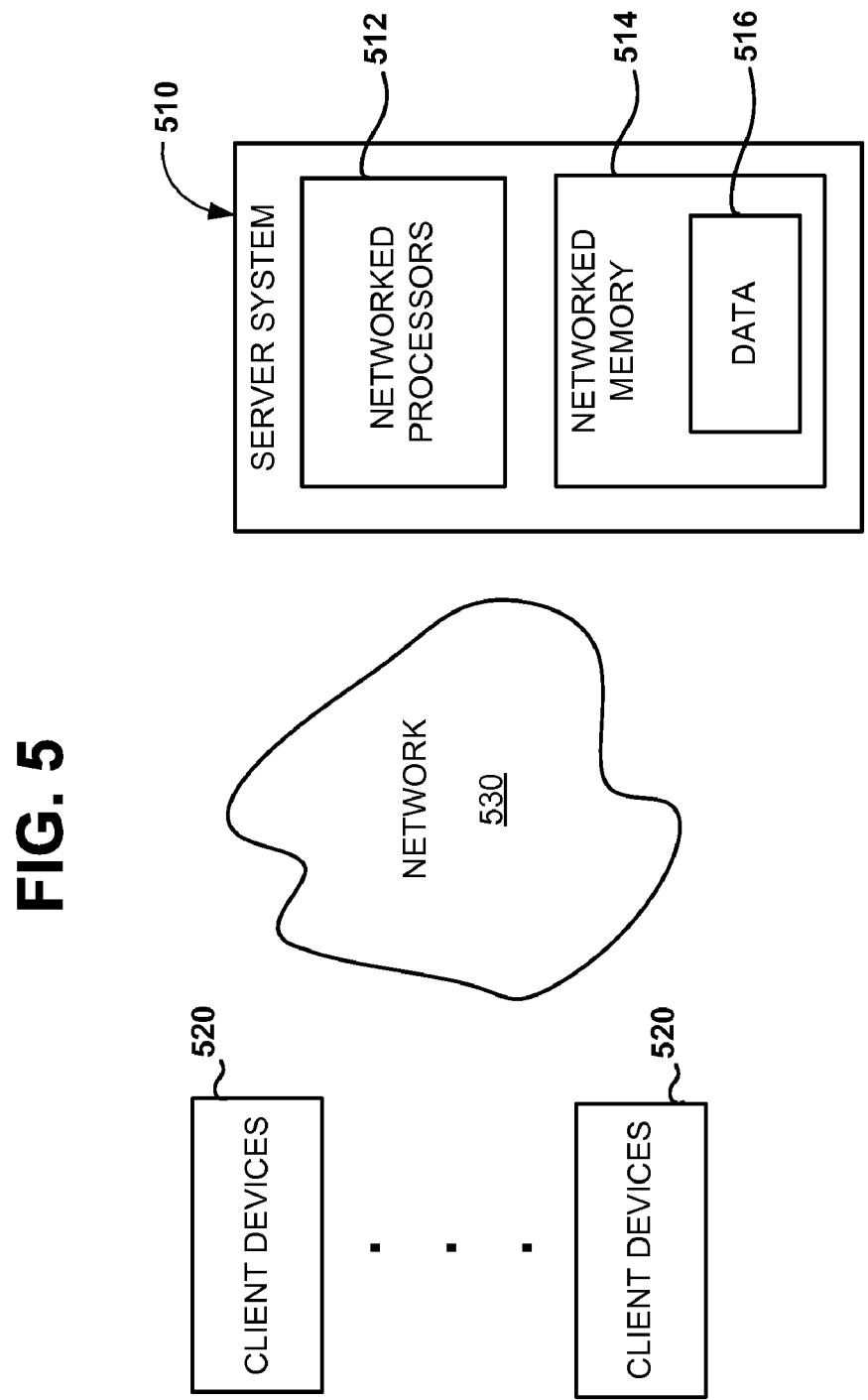
FIG. 5 is an illustration of a system in accordance with an embodiment of the present invention.

Reference is now made to FIG. 5, which illustrates another exemplary system—a server system 510—for editing a collection of images. The server system 510 communicates with client devices 520 via a network 530. The client devices 520 can upload images to the server system 510. Examples of client devices 520 include, but are not limited to, computers (e.g., desktop, laptop, PDAs and other handheld devices), mobile phones, printers, portable media players, gaming consoles, video cameras, and digital cameras.

The server system 510 includes networked processors 512 and memory 514. The memory 514 is encoded with data 516 for causing the server system 510 to run a web site that allows the client devices 520 to upload images to the server system 510, and chose a theme for the images. The data 516 also causes the server system 520 to perform batch processing by applying image editing operations to each collection of images to give the edited images a look and feel that is consistent with the selected theme.

In some embodiments of the present invention, the server system 510 can be part of an online photofinishing system.

The photofinishing system could also include a means (e.g., networked printers) for making prints.

In some embodiments of the present invention, the sever system 510 could be part of a publishing system. The publishing system could also include search capability and an information store.

The invention claimed is:

1. A method of processing a collection of images, the method comprising:
   receiving identification of a theme selected from among plural themes for the collection of images;
   labeling predefined groups of image editing operations according to corresponding ones of the plural themes, wherein each of the predefined groups includes respective image editing operations;
   performing, by a processor, batch processing on the collection of images, the batch processing including applying a particular one of the plural predefined groups of image editing operations to the images to give the edited images a look and feel that is consistent with the selected theme, wherein the particular predefined group is associated with the selected theme; and
   outputting, by the processor, the edited images for printing.

2. The method of claim 1, further comprising automatically ascertaining the selected theme from a context of the images in the collection.

3. The method of claim 1, wherein the particular predefined group includes multiple, sequential image editing operations.

4. A method of editing a document including a collection of images, the method comprising processing the collection of images according to the method of claim 1.

5. A method comprising creating a publication including processing the publication according to the method of claim 1.

6. The method of claim 5, wherein the batch processing is performed on at least some of content, designs and advertisements.

7. A system comprising:
   a memory to store a collection of images; and
   a processor to:
      cause display of a plurality of different themes;
      receive selection of a particular one of the themes, wherein plural predefined groups of image editing operations are labeled according to respective ones of the themes, wherein each of the predefined groups includes respective image editing operations, and wherein a particular one of the predefined groups is associated with the particular theme;
      perform batch processing on the collection of images, the batch processing including applying the image editing operations of the particular predefined group to the images to give the edited images a look and feel that is consistent with the particular theme; and
   output the edited images for printing.

8. The system of claim 7, wherein receiving the selection of the particular theme comprises automatically selecting the particular theme by ascertaining a context of the images.

9. The system of claim 7, comprising a server system including the memory and the processor.

10. A photofinishing system comprising the server system of claim 7.

11. A picture kiosk comprising the system of claim 7.

12. A publishing system comprising the system of claim 7.

13. A printer comprising the system of claim 7.

14. An article comprising non-transitory machine memory encoded with program data that upon execution by a processor causes the processor to:
   receive a selected theme from a plurality of themes;
   label predefined groups of image editing operations according to corresponding ones of the plurality of themes, wherein each of the predefined groups includes respective image editing operations;
   perform batch processing on a collection of images, the batch processing including applying image editing operations of a particular one of the predefined groups to the images to give the edited images a look and feel that is consistent with the selected theme, wherein the particular predefined group is associated with the selected theme; and
   output the edited images for printing.

15. The article of claim 14, wherein the program data also causes the machine to automatically select one of the themes by ascertaining a context of the image collection.

16. The method of claim 1, wherein the receiving, performing, and outputting are performed by the processor in a printer.

17. The article of claim 14, wherein the processor is part of a printer.

* * * * *

UNITED STATES PATENT AND TRADEMARK OFFICE
CERTIFICATE OF CORRECTION

| | | |
|---|---|---|
| PATENT NO. | : 7,925,121 B2 | Page 1 of 1 |
| APPLICATION NO. | : 11/742493 | |
| DATED | : April 12, 2011 | |
| INVENTOR(S) | : Nathan M. Moroney et al. | |

It is certified that error appears in the above-identified patent and that said Letters Patent is hereby corrected as shown below:

In column 6, line 16, in Claim 10, delete "claim 7." and insert -- claim 9. --, therefor.

Signed and Sealed this
Sixteenth Day of August, 2011

David J. Kappos
*Director of the United States Patent and Trademark Office*